United States Patent
Nerieri et al.

(10) Patent No.: US 8,417,222 B1
(45) Date of Patent: Apr. 9, 2013

(54) SYSTEMS AND METHODS FOR DELIVERING MESSAGES BASED ON A DEVICE RADIO STATUS

(75) Inventors: Francesco Nerieri, Santa Cruz, CA (US); Ashish Sharma, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/557,775

(22) Filed: Jul. 25, 2012

Related U.S. Application Data

(60) Provisional application No. 61/663,208, filed on Jun. 22, 2012.

(51) Int. Cl.
*H04M 1/725* (2006.01)

(52) U.S. Cl.
USPC ............. 455/412.2; 455/412.1; 455/466; 455/574; 709/203

(58) Field of Classification Search ....... 455/412.1–415, 455/466, 458, 567; 709/203–206
See application file for complete search history.

(56) References Cited

U.S. PATENT DOCUMENTS

| | | | | |
|---|---|---|---|---|
| 5,446,759 A * | 8/1995 | Campana, Jr. | ............... | 375/267 |
| 5,797,094 A * | 8/1998 | Houde et al. | ............... | 455/412.2 |
| 6,389,457 B2 * | 5/2002 | Lazaridis et al. | ............ | 709/207 |
| 7,010,303 B2 * | 3/2006 | Lewis et al. | .................. | 455/445 |
| 7,283,805 B2 | 10/2007 | Agrawal | | |
| 7,813,720 B2 * | 10/2010 | Doffman | ................... | 455/414.1 |
| 7,974,194 B2 | 7/2011 | Tripathi et al. | | |
| 8,170,589 B2 * | 5/2012 | Li et al. | ......................... | 455/466 |
| 8,213,971 B2 * | 7/2012 | Papineau et al. | ............. | 455/418 |
| 8,254,890 B2 * | 8/2012 | Hung et al. | ................ | 455/412.1 |
| 8,311,041 B1 * | 11/2012 | Nerieri et al. | ................. | 370/390 |
| 8,320,943 B2 * | 11/2012 | Tysowski | ..................... | 455/466 |
| 2003/0096600 A1 * | 5/2003 | Lewis et al. | ................... | 455/412 |
| 2003/0194990 A1 * | 10/2003 | Helferich | ................... | 455/412.2 |
| 2008/0085700 A1 * | 4/2008 | Arora | ......................... | 455/414.3 |
| 2009/0181671 A1 * | 7/2009 | Preiss et al. | ................ | 455/435.1 |
| 2010/0088367 A1 * | 4/2010 | Brown et al. | ................. | 709/203 |
| 2010/0149975 A1 * | 6/2010 | Tripathi et al. | ............. | 370/230.1 |
| 2011/0060801 A1 * | 3/2011 | Virk et al. | ..................... | 709/206 |
| 2011/0223945 A1 * | 9/2011 | Bhatnagar | .................... | 455/466 |

\* cited by examiner

*Primary Examiner* — Sharad Rampuria

(74) *Attorney, Agent, or Firm* — Troutman Sanders LLP; James E. Schutz; Mark Lehi Jones

(57) ABSTRACT

Certain embodiments of the disclosed technology may include systems and methods for delivering messages based on a device radio status According to an example embodiment of the disclosed technology, a method is provided for delivering messages to a device. The method can include receiving, at a server, one or more messages for transmission to a mobile device; storing the one or more messages at the server; receiving one or more radio status indicators from the mobile device; holding the one or more stored messages at the server until the received one or more radio status indicators include an indication of an active radio state in the mobile device; and transmitting the one or more held messages to the mobile device upon receiving an indication that the mobile device radio is in an active state.

17 Claims, 5 Drawing Sheets

SYSTEMS AND METHODS FOR DELIVERING MESSAGES BASED ON A DEVICE RADIO STATUS

RELATED APPLICATIONS

This application is related to provisional application Ser. No. 61/663,208, filed on Jun. 22, 2012 entitled: "Systems and Methods for Delivering Messages Based on a Device Radio Status," the contents of which are hereby incorporated by reference in their entirety.

TECHNICAL FIELD

The disclosed technology generally relates to delivering messages to a device, and in particular, to delivering messages based on a device radio status.

BACKGROUND

The widespread adoption of mobile computing devices has enabled a mobile workforce and has provided numerous benefits and conveniences for users of the mobile devices. Many web applications have been developed that can send messages, updates, and other specific information to the mobile device in the form of push messages, instant messages, SMS messages, etc. One of the challenges presented to application developers, manufacturers, and users of the mobile devices involves a relationship between an active reception state of the mobile device and a corresponding reduction of battery usage time between charges. A typical mobile device can receive and acknowledge messages, updates, etc., when the device's radio or radios are in an active state, but leaving radios powered all the time can prematurely drain the battery.

BRIEF SUMMARY

Some or all of the above needs may be addressed by certain embodiments of the disclosed technology. Certain embodiments of the disclosed technology may include systems and methods for delivering messages based on a device radio status.

According to an implementation of the disclosed technology, a method is provided for delivering messages to a device. The method can include receiving, at a server, one or more messages for transmission to a mobile device. The method can include storing the one or more messages at the server, receiving one or more radio status indicators from the mobile device, and holding the one or more stored messages at the server until the received one or more radio status indicators include an indication of an active radio state in the mobile device. The method may include transmitting the one or more held messages to the mobile device upon receiving an indication that the mobile device radio is in an active state.

According to another implementation, a system is provided to receive, at a server, one or more messages for transmission to a mobile device. The system may store the one or more messages at the server, receive one or more radio status indicators from the mobile device, and hold the one or more stored messages at the server until the received one or more radio status indicators include an indication of an active radio state in the mobile device. The system may initiate transmission of the one or more held messages to the mobile device upon receiving an indication that the mobile device radio is in an active state.

According to another implementation, a non-transitory computer-readable medium is provided for instructing one or more processors for receiving, at a server, one or more messages for transmission to a mobile device. The computer-readable medium may further provide instructions to the one or more processors for storing the one or more messages at the server, receiving one or more radio status indicators from the mobile device, and holding the one or more stored messages at the server until the received one or more radio status indicators include an indication of an active radio state in the mobile device. The computer-readable medium may further provide instructions to the one or more processors for transmitting the one or more held messages to the mobile device upon receiving an indication that the mobile device radio is in an active state.

According to an implementation of the disclosed technology, a computer-implemented method is provided for receiving push messages. The method includes monitoring a radio status associated with a mobile device. The method includes sending, based at least in part on the monitoring, one or more radio status indicators from the mobile device. The method may include receiving, at the mobile device, one or more messages based at least in part on the sending of the one or more radio status indicators.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
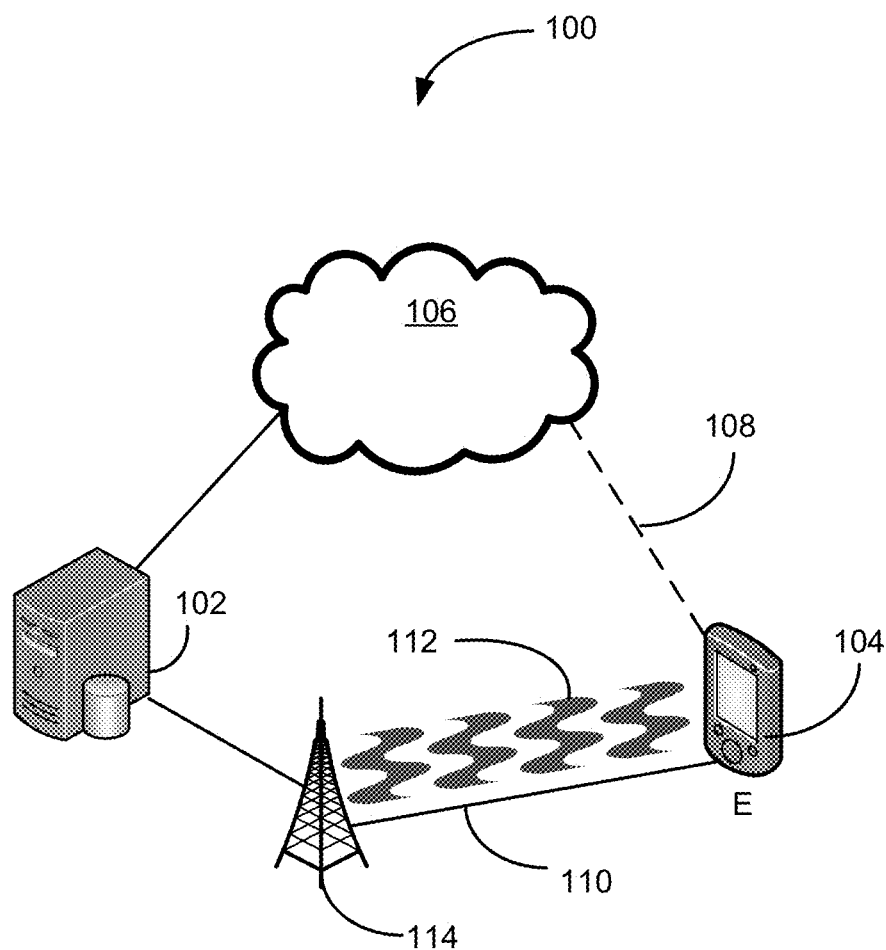
FIG. 1 is a block diagram of an illustrative mobile communications system 100 according to an implementation of the disclosed technology.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "implementation," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain embodiments of the disclosed technology may address the problem of holding messages on a server while the mobile device is in a low power (or dormant) state. Implementations may utilize information about the state of the mobile device's communication radio to determine when to send the messages to the mobile device. Implementations may utilize a low-power communications connection between the server and the mobile device to notify the server of the device's radio status. Implementations may notify the server when the device's radio has been turned on (or placed in an active state) so that held messages may be delivered.

According to implementations, the low-power communications connection may be a persistent connection that is akin to a periodic ping or heartbeat signal that allows the mobile device to return to a lower power listening state between pings. According to implementations, a mobile connection service (MCS) may provide the low-power or persistent communications connection for communicating the device's radio state to the server. Those skilled in the art will recognize the MCS may be utilized to request radio resources from the device, and/or the MCS may be utilized to communicate the device's radio status to the server. For example, if no packets are being sent or received, the mobile device (or the server) may send a heartbeat ping packet to tell the other end that the connection is still alive. For example, pings may be exchanged every minute or at some other predetermined periodic interval. For example, in one implementation, the pings may be exchanged ever 28 minutes. According to implementations, the server can use knowledge obtained from this method to send information to the device and vice-versa.

Implementations of the disclosed technology enable conservation of computing and battery resources, at least in part, because the mobile device's radio does not necessarily need to wake up to receive every new message as it arrives at the server. According to an implementation, low priority push messages may be held on the server, for example, until a predetermined time has elapsed. In an implementation, when the server receives a notification that the device's radio has been turned on, messages that were held may be sent to the device. Embodiments of this disclosed technology may help optimize sending push messages from the server to the device. Embodiments of the disclosed technology may also help extend a device's battery charge by holding messages until the device's radio has been turned on for other reasons.

In accordance with certain implementations, the mobile device may default to a low-power listening mode when it is not active to enable the reception of SMS messages or phone calls. According to an implementation, after messaging, phone calls, or other communications requiring the radio has completed, and if there is no further traffic, the radio on the mobile device can switch from high power mode to low power mode, or to a listen mode. If at any point in time a server needs to send a message to the mobile device, which is in listen mode, the network can send a signal to instruct the mobile device to power-up (or wake-up) the radio. In accordance with an implementation, the mobile device may obtain a socket of the persistent connection and listen for data that is being sent to the device via the socket.

According to implementations, the mobile device radio may be in different states of operation, depending on the situation. For example, when sending information or uploading data to the server or cellular network, the mobile device radio may be in a high-powered or active communication mode. During certain periods, the mobile device may be in a low-power or listen mode only. The radio may be off when the mobile device is completely powered off.

Various systems, arrangements, and architectures may be utilized for delivering messages to a device, according to implementations of the disclosed technology, and will now be described with reference to the accompanying figures.

FIG. 1 is a block diagram of an illustrative mobile communications system 100 according to an example embodiment of the disclosed technology. The system 100 may include a server 102 with architecture, associated memory storage, peripherals, etc. that will be subsequently discussed with reference to FIG. 3. The server 102 may communicate with a mobile device 104. Those skilled in the art recognize that there are several categories of mobile devices 104, generally known as portable computing devices that can run on batteries but are not usually classified as laptops. For example, mobile devices 104 can include, but are not limited to portable computers, tablet PCs, Internet tablets, PDAs, ultra mobile PCs (UMPCs) and smart phones.

In an implementation, and with continued reference to FIG. 1, the server 102 may communicate with the mobile device 104 through a Wi-Fi™ channel or some other Internet connection 108, for example, and may utilize cloud services or the Internet 106 for communication between the mobile device 104 and the server 102. According to an implementation, the server 102 may communicate to the mobile device 104 through a service provider 114. For example, the service provider 114 may provide cellular service through cellular radio channels 112 for communicating with the mobile device 104. According to an implementation, the service provider 114 may also communicate with the mobile device 104 through the MCS 110. According to implementations of the disclosed technology, the server 102 may communicate or send messages to the mobile device 104 through the service provider 114.

According to implementations, there may be situations where the mobile device is not in range of a Wi-Fi™ channel or other Internet connection 108, and any information communications with the server may then be accomplished via the service provider 114. However, in situations where the mobile device 104 has an Internet connection 108, the server 102 may communicate with the mobile device 104 (for at least a certain class of signals and messages) via the cloud or internet 106 without needing to utilize the service provider 114.

Figure 2:
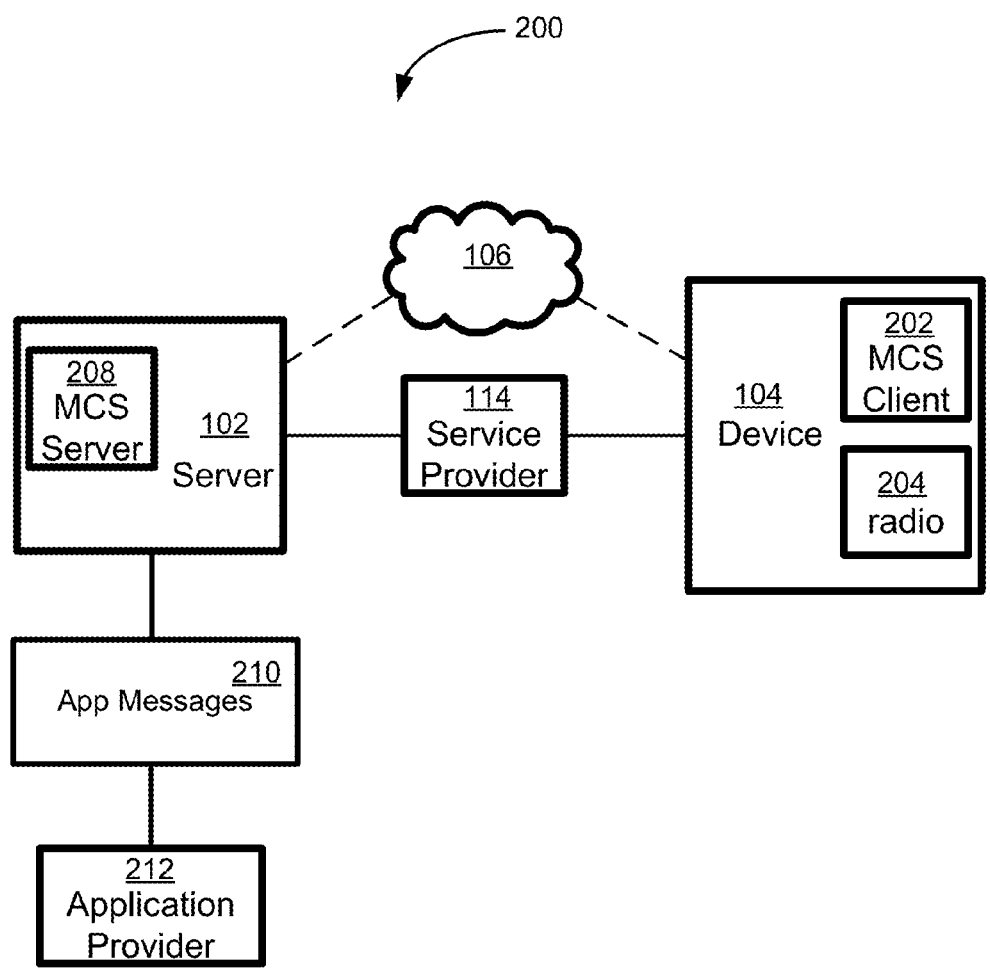
FIG. 2 is an illustrative block diagram of a messaging system 200 according to an implementation of the disclosed technology.

FIG. 2 is an illustrative block diagram of a messaging system 200 according to an implementation of the disclosed technology. In one embodiment, an application provider 212 or other service may send a message 210 to the server 102 for delivery to the mobile device 104. Messages 210, for example, may include, but are not limited to, a push messages, notifications, updates, etc. For example, the mobile device may be subscribed to an application notification service that sends sports score updates periodically to the mobile device.

In an implementation, the messages 210 may be delivered after a given time has elapsed, or after an MCS server 208 has received a notification from the MCS client 202 that the mobile device 104 radio 204 has been activated. Upon notification of the active radio 204, messages 210 held at the server 102 may be sent to the mobile device 104 via the service provider 114 or the Internet 106, as previously discussed with regard to FIG. 1.

According to one implementation, a mobile device user may set preferences such that all such messages 210 may be delivered to the mobile device 102 as soon as they arrive. According to another implementation, the messages 210 may be categorized by priority, and high-priority messages may be delivered immediately, while low-priority messages may be held until the radio 204 is active, or until after a predetermined period has elapsed.

Figure 3:
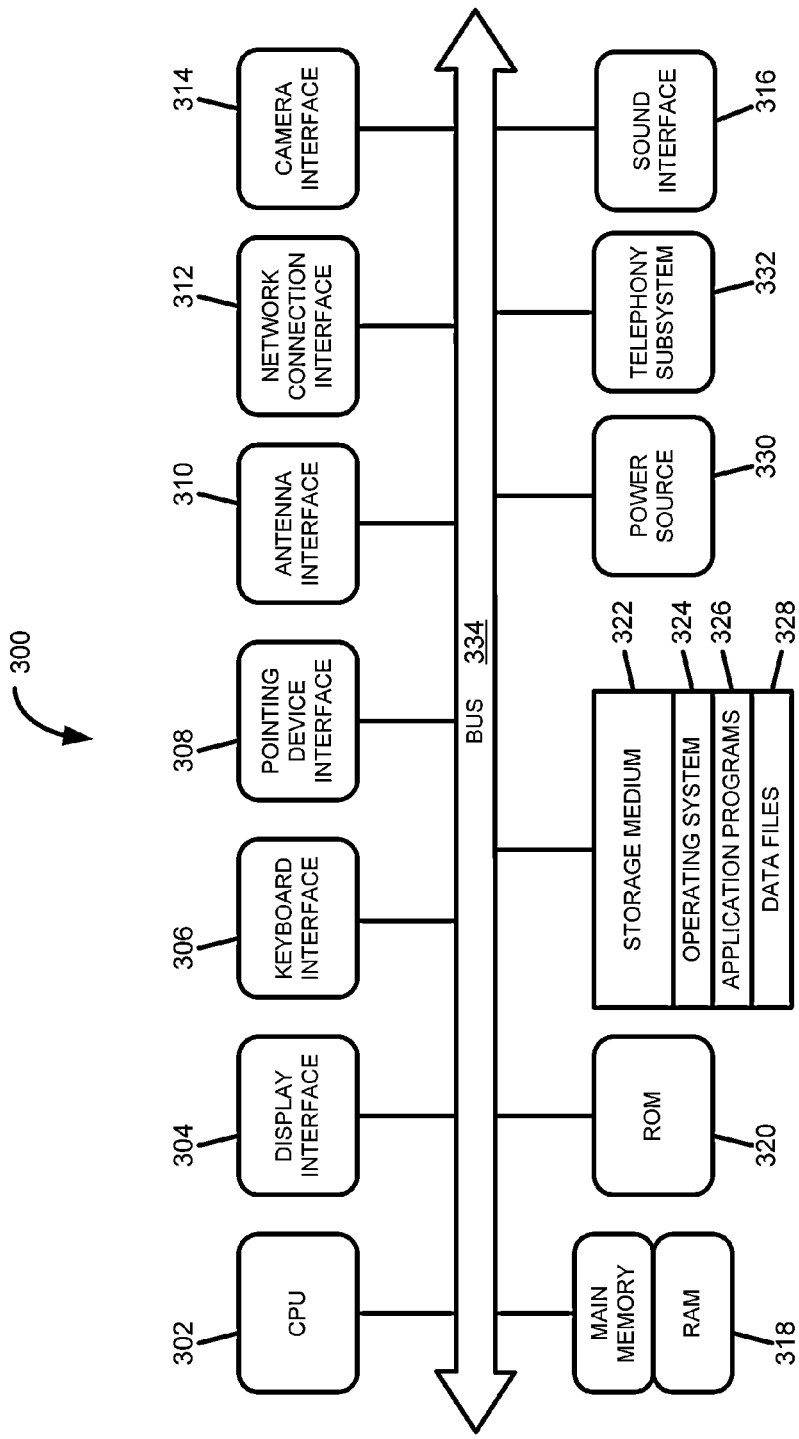
FIG. 3 is a block diagram of an illustrative computer system architecture 300 according to an implementation of the disclosed technology.

FIG. 3 depicts a block diagram of an illustrative computer system architecture 300 corresponding to the server (for example, the server 102 in FIGS. 1 and 2) according to an implementation of the disclosed technology. Certain aspects of FIG. 3 may also be embodied in the mobile device (for example, the mobile device 104 as shown in FIGS. 1 and 2). Various embodiments of the communication systems 100 and messaging systems 200, and methods herein may be embodied in non-transitory computer readable media for execution by a processor. An implementation may be used in an application of a mobile computing device, such as a smartphone or tablet, but other computing devices may also be used. It will be understood that the architecture illustrated in FIG. 3 is provided for exemplary purposes only and does not limit the scope of the various embodiments of the communication systems and methods.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen. Implementations of the architecture 300 may include an antenna interface 310 that provides a communication interface to an antenna; a network connection interface 312 that provides a communication interface to a network. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to implementations, a random access memory (RAM) 318 is provided, where computer instructions and data are stored in a volatile memory device for processing by the CPU 302.

According to an implementation, the architecture 300 includes a read-only memory (ROM) 320 where invariant low-level systems code or data for basic system functions such as basic input and output (I/O), startup, or reception of keystrokes from a keyboard are stored in a non-volatile memory device. According to an implementation, the architecture 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an implementation, the architecture 300 includes a power source 330 that provides an appropriate alternating current (AC) or direct current (DC) to power components. According to an implementation, the architecture 300 includes a and a telephony subsystem 332 that allows the device 300 to transmit and receive sound over a telephone network. The constituent devices and the CPU 302 communicate with each other over a bus 334.

In accordance with implementations, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the device 300 or to upload data onto the device 300. A computer program product, such as one utilizing a communication system may be tangibly embodied in storage medium 322, which may comprise a machine-readable storage medium.

Figure 4:
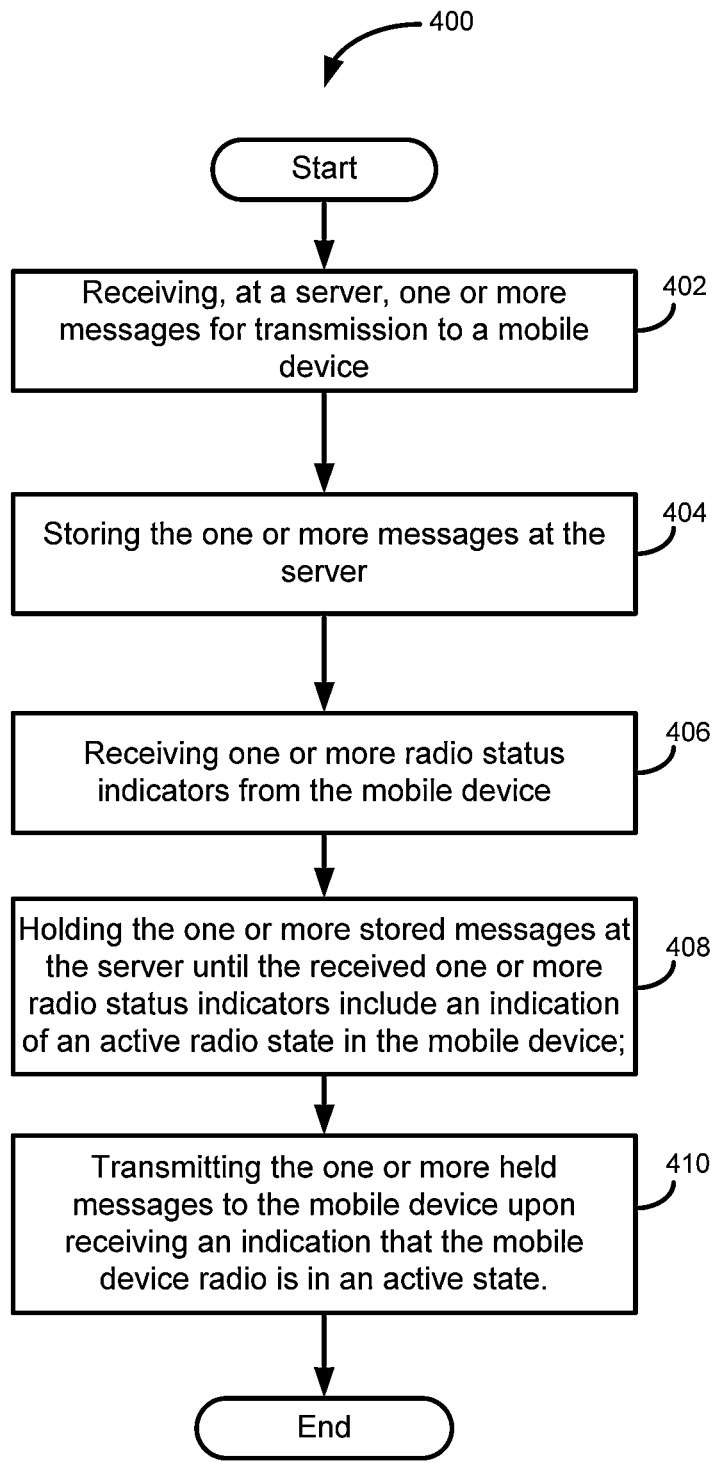
FIG. 4 is a flow diagram of an exemplary method 400 according to an implementation of the disclosed technology.

An exemplary method 400 for delivering messages to a device will now be described with reference to the flowchart of FIG. 4. The method 400 starts in block 402, and according to an implementation of the disclosed technology includes receiving, at a server, one or more messages for transmission to a mobile device. In block 404, the method 400 includes storing the one or more messages at the server. In block 406, the method 400 includes receiving one or more radio status indicators from the mobile device. In block 408, the method 400 includes holding the one or more stored messages at the server until the received one or more radio status indicators include an indication of an active radio state in the mobile device. In block 410, the method 400 includes transmitting the one or more held messages to the mobile device upon receiving an indication that the mobile device radio is in an active state. The method 400 ends after block 410.

Figure 5:
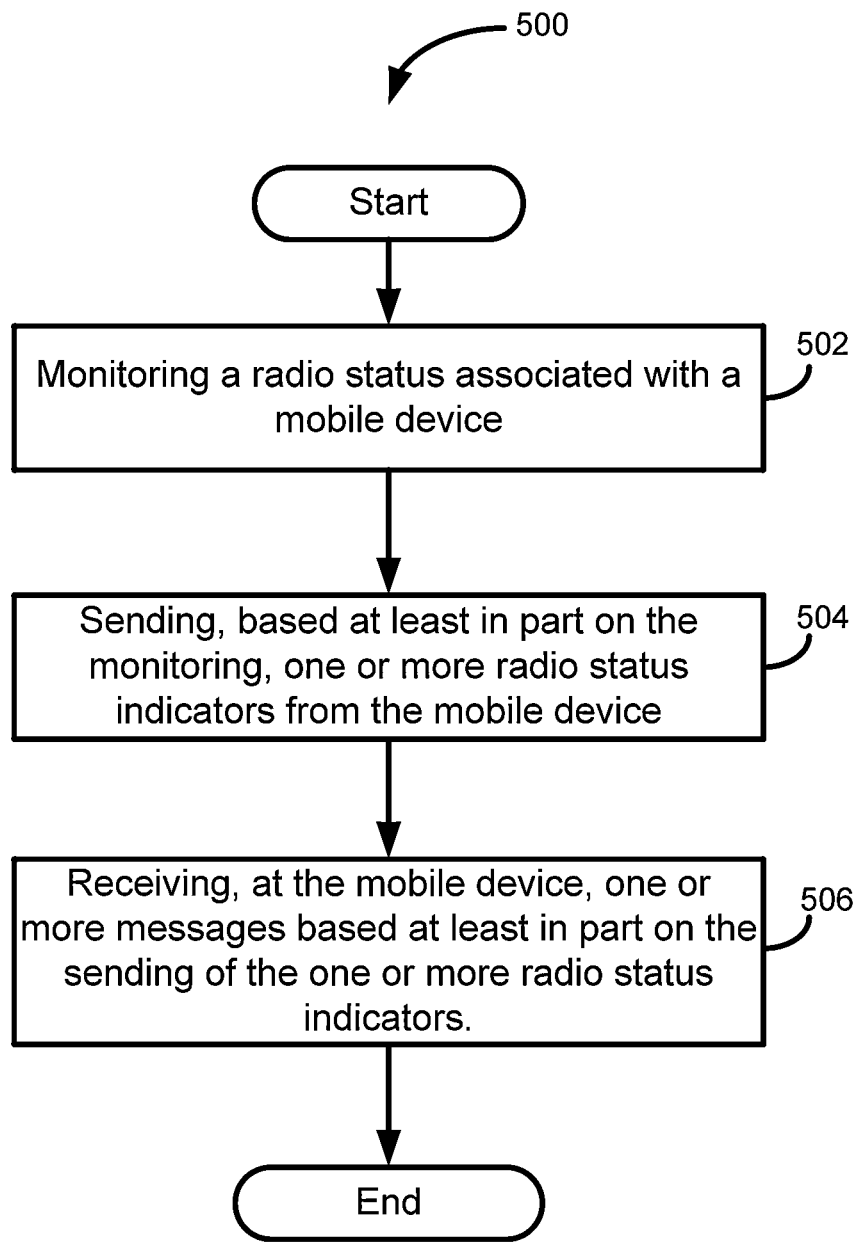
FIG. 5 is a flow diagram of an exemplary method 500 according to an implementation of the disclosed technology.

An exemplary method 500 for receiving messages at a device will now be described with reference to the flowchart of FIG. 5. The method 500 starts in block 502, and according to an implementation of the disclosed technology includes monitoring a radio status associated with a mobile device. In block 504, the method 500 includes sending, based at least in part on the monitoring, one or more radio status indicators from the mobile device. In block 506, the method 500 includes receiving, at the mobile device, one or more messages based at least in part on the sending of the one or more radio status indicators. The method 500 ends after block 506.

According to an implementation, receiving the one or more messages includes receiving one or more application messages from an application provider. In one embodiment, the one or more application messages include one or more push messages. In certain implementations, receiving the radio status indicators from the mobile device includes receiving indicators by a persistent connection from the server to the mobile device. In an implementation, receiving indicators by the persistent connection includes receiving indicators by an MCS connection. In certain implementations, receiving the one or more messages further includes receiving an indication of message priority, wherein a radio wake message is transmitted to activate the mobile device radio when a high priority message is received at the server.

According to implementations, certain technical effects can be provided, such as creating certain systems and methods that address the problem of holding messages on a server and sending the messages to a device. Implementations of the disclosed technology can provide the further technical effects of providing systems and methods for extending battery life in a mobile device.

In implementations of the disclosed technology, the mobile communications system 100 and/or the messaging system 200 may include any number of hardware and/or software applications that are executed to facilitate any of the operations. In implementations, one or more I/O interfaces may facilitate communication between the mobile communications system 100 and/or the messaging system 200 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the mobile communications system 100 and/or the messaging system 200. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the mobile communications system 100 and/or the messaging system 200 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the mobile communications system 100, the messaging system 200, and/or the computer architecture 300 with more or less of the components illustrated in FIGS. 1-3.

Certain embodiments of the disclosed technology are described above with reference to block and flow diagrams of systems and methods and/or computer program products according to implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain embodiments of the disclosed technology are described above with reference to mobile devices. Those skilled in the art recognize that there are several categories of mobile devices, generally known as portable computing devices that can run on batteries but are not usually classified as laptops. For example, mobile devices can include, but are not limited to, portable computers, tablet PCs, Internet tablets, PDAs, ultra mobile PCs (UMPCs) and smartphones.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for delivering messages to a device, the method comprising:
   receiving, at a server, one or more push messages from an application provider for transmission to a mobile device;
   storing the one or more messages at the server;
   receiving one or more radio status indicators from the mobile device by a persistent connection, wherein receiving indicators by the persistent connection comprises receiving indicators by a mobile connection server (MCS) connection;
   holding the one or more stored messages at the server until the received one or more radio status indicators include an indication of an active radio state in the mobile device; and
   transmitting the one or more held messages to the mobile device after receiving an indication that the mobile device radio is in an active state.

2. The computer-implemented method of claim 1, wherein receiving the one or more messages comprises receiving one or more application messages from the application provider.

3. The computer-implemented method of claim 1, wherein the persistent connection includes a communication channel between the mobile device and the server.

4. The computer-implemented method of claim 1, wherein receiving the one or more messages further comprises receiving an indication of message priority, wherein a radio wake message is transmitted to activate the mobile device radio when a high priority message is received at the server.

5. A system comprising:
   at least one memory for storing data and computer-executable instructions; and
   at least one processor configured to access the at least one memory and further configured to execute the computer-executable instructions to cause the system to:
      receive, at a server, one or more push messages from an application provider for transmission to a mobile device;
      store the one or more messages at the server;
      receive one or more radio status indicators from the mobile device by a persistent connection, wherein the persistent connection comprises a mobile connection server (MCS) connection;
      hold the one or more stored messages at the server until the received one or more radio status indicators include an indication of an active radio state in the mobile device; and
      initiate transmission of the one or more held messages to the mobile device upon receiving an indication that the mobile device radio is in an active state.

6. The system of claim 5, wherein the one or more messages comprises one or more application messages from the application provider.

7. The system of claim 5, wherein the persistent connection includes a communication channel between the mobile device and the server.

8. The system of claim 5, wherein the one or more messages further comprises an indication of message priority, and wherein a radio wake message is transmitted to activate the mobile device radio when a high priority message is received at the server.

9. A computer-readable storage medium that stores instructions executable by one or more processors to perform a method comprising:
   receiving, at a server, one or more push messages from an application provider for transmission to a mobile device;
   storing the one or more messages at the server;
   receiving one or more radio status from the mobile device by a persistent connection, wherein receiving indicators by the persistent connection comprises receiving indicators by a mobile connection server (MCS) connection;
   holding the one or more stored messages at the server until the received one or more radio status indicators include an indication of an active radio state in the mobile device; and
   transmitting the one or more held messages to the mobile device upon receiving an indication that the mobile device radio is in an active state.

10. The computer-readable medium of claim 9, wherein receiving the one or more messages comprises receiving one or more application messages from the application provider.

11. The computer-readable medium of claim 9, wherein the persistent connection includes a communication channel between the mobile device and the server.

12. The computer-readable medium of claim 9, wherein receiving the one or more messages further comprises receiving an indication of message priority, wherein a radio wake message is transmitted to activate the mobile device radio when a high priority message is received at the server.

13. A computer-implemented method for receiving push messages, the method comprising:
   monitoring a radio status associated with a mobile device;
   sending, based at least in part on the monitoring, one or more radio status indicators from the mobile device by a persistent connection, wherein sending indicators by the persistent connection comprises sending indicators by a mobile connection server (MCS) connection; and
   receiving, at the mobile device, one or more push messages from an application provider based at least in part on the sending of the one or more radio status indicators.

14. The computer-implemented method of claim 13, wherein receiving the one or more messages comprises receiving one or more application messages from the application provider.

15. The computer-implemented method of claim 13, wherein receiving the one or more messages is based on a radio status indication that the mobile device radio is in an active state.

16. The computer-implemented method of claim 13, further comprising receiving a radio wake indicator when a high priority message is available.

17. The computer-implemented method of claim 13, wherein the mobile device radio is activated upon receiving the radio wake indicator.

* * * * *